(12) United States Patent
Murata et al.

(10) Patent No.: US 6,683,261 B2
(45) Date of Patent: Jan. 27, 2004

(54) COMBINATION WEIGHTING APPARATUS WITH ROTATIONAL SUPPLY UNIT THAT GIVES PRIORITY TO SUPPLYING DOWNSTREAM WEIGHING UNITS

(75) Inventors: Shuuji Murata, Ritto (JP); Kazuhisa Chimura, Ritto (JP)

(73) Assignee: Ishida Co., Ltd., Kyoto (JP)

( * ) Notice: Subject to any disclaimer, the term of this patent is extended or adjusted under 35 U.S.C. 154(b) by 191 days.

(21) Appl. No.: 10/038,807

(22) Filed: Jan. 8, 2002

(65) Prior Publication Data
US 2002/0088650 A1 Jul. 11, 2002

(30) Foreign Application Priority Data
Jan. 9, 2001 (JP) ........................ 2001-001239

(51) Int. Cl.[7] .................. G01G 19/413; G01G 13/02
(52) U.S. Cl. ................ 177/25.18; 177/103; 177/119; 177/121
(58) Field of Search ............. 177/25.18, 103, 177/119, 120, 121

(56) References Cited

U.S. PATENT DOCUMENTS

| | | | |
|---|---|---|---|
| 4,418,772 A | * 12/1983 | Fukuda | 177/25.18 |
| 4,421,185 A | * 12/1983 | Koto et al. | 177/25.18 |
| 4,491,189 A | * 1/1985 | Fukuda | 177/25.18 |
| 4,821,820 A | * 4/1989 | Edwards et al. | 177/25.18 |
| 4,844,190 A | * 7/1989 | Mikami et al. | 177/25.18 |
| 6,262,377 B1 | * 7/2001 | Nielsen et al. | 177/103 |
| 6,462,287 B1 | * 10/2002 | Mikesell | 177/25.18 |
| 2002/0020567 A1 | * 2/2002 | Asai et al. | 177/25.18 |

FOREIGN PATENT DOCUMENTS

| | | |
|---|---|---|
| DE | 43 06 245 A1 | 9/1994 |
| EP | 0 982 570 A2 | 3/2000 |
| GB | 2 095 848 A | 10/1982 |

* cited by examiner

*Primary Examiner*—Randy Gibson
(74) *Attorney, Agent, or Firm*—Shinjyu Global IP Counselors, LLP

(57) ABSTRACT

The combination weighing apparatus is an apparatus that conducts combination weighing of articles based upon weight data from a plurality of weight hoppers, and is comprised of a plurality of supply buckets that supply articles to any of a plurality of weighing hoppers, a rotation mechanism that rotates the supply buckets so that they move along an arrangement of the weighing hoppers in a weighing area, and a control computer. The control computer controls the supply of articles from the supply buckets inside the weighing area to the weighing buckets, and from amongst the plurality of weighing hoppers that request a supply of articles, priority is given to the weighing buckets that are downstream in the direction of rotation, and article supply takes place. In a combination weighing apparatus that supplies articles from supply buckets that rotates with respect to weighing hoppers, preventing difficult situations such as articles being supplied to predetermined weighing hoppers, and improving the accuracy of combination weighing.

14 Claims, 8 Drawing Sheets

| Supply buckets 20-1~20-9 | × | × | × | × | ⓝ | ⓞ | ⓟ | ⓡ | ⓢ |
|---|---|---|---|---|---|---|---|---|---|
| Weighing hoppers 41~49 | ⓐ | ⓘ | ⓙ | ⓒ | ⓓ | ⓚ | ⓛ | ⓜ | ⓖ |

(b)

| Supply buckets 20-1~20-9 | × | × | × | ⓝ | ⓞ | ⓟ | ⓡ | ⓢ | ⓣ |
|---|---|---|---|---|---|---|---|---|---|
| Weighing hoppers 41~49 | × | ⓘ | ⓙ | × | × | ⓚ | ⓛ | ⓜ | ⓖ |

(c)

| Supply buckets 20-1~20-9 | × | ⓝ | ⓝ | ⓞ | ⓟ | ⓡ | ⓢ | ⓣ | ⓤ |
|---|---|---|---|---|---|---|---|---|---|
| Weighing hoppers 41~49 | × | ⓘ | ⓙ | × | × | ⓚ | ⓛ | ⓜ | ⓖ |

(d)

| Supply buckets 20-1~20-9 | × | × | × | × | ⓡ | ⓢ | ⓣ | ⓤ | ⓥ |
|---|---|---|---|---|---|---|---|---|---|
| Weighing hoppers 41~49 | × | ⓙ | ⓞ | ⓟ | ⓚ | ⓛ | ⓜ | ⓖ | ⓖ |

| Supply buckets 20-1~20-9 | n | × | × | r | s | t | u | v | w |
|---|---|---|---|---|---|---|---|---|---|
| Weighing hoppers 41~49 | × | i | j | o | p | k | l | m | g |

(b)

| Supply buckets 20-1~20-9 | × | × | r | s | t | u | v | x | x |
|---|---|---|---|---|---|---|---|---|---|
| Weighing hoppers 41~49 | n | i | × | × | p | k | l | m | w |

(c)

| Supply buckets 20-1~20-9 | × | × | × | t | u | v | x | x | y |
|---|---|---|---|---|---|---|---|---|---|
| Weighing hoppers 41~49 | n | i | r | s | p | k | l | m | w |

(d)

| Supply buckets 20-1~20-9 | × | × | t | u | v | x | x | y | z |
|---|---|---|---|---|---|---|---|---|---|
| Weighing hoppers 41~49 | n | i | r | s | p | k | l | m | w |

# COMBINATION WEIGHTING APPARATUS WITH ROTATIONAL SUPPLY UNIT THAT GIVES PRIORITY TO SUPPLYING DOWNSTREAM WEIGHING UNITS

BACKGROUND OF THE INVENTION

1. Field of the Invention

This invention generally relates to a combination weighing apparatus. More specifically, the present invention relates to a combination weighing apparatus that weighs a combination of articles based upon weight data from a plurality of weighing members.

2. Background Information

Combination weighing is generally desirable for its speed and accuracy. In combination weighing, the weight and number of articles received by each of a plurality of hoppers is measured by a load cell (a weight detector). The combined weights of each are calculated and a plurality of hoppers is selected to make a combined weight that is within a predetermined range of weights, and the articles from these hoppers are collected. This allows a collection of articles with a predetermined weight or a predetermined quantity to be obtained.

The present inventors have invented and applied for a patent on this type of combination weighing apparatus, which employs a construction in which article supply members (buckets) circulate to supply articles for each hopper to be weighed (Japanese Patent Application No. 2000-221871). The combination weighing device related to this invention rotates a plurality of buckets that collect articles loaded therein, and when a bucket comes to a position opposite one of the plurality of weighing hoppers that is empty, the articles in a bucket are dropped down into the weighing hopper. In other words, the buckets rotate above the weighing hoppers, and when there is an empty weighing hopper below, a bucket drops articles into the weighing hopper.

However, if a bucket conducts an article supply operation when there is an empty weighing hopper below it and other conditions are not taken into consideration, it tends to be difficult to supply articles to an empty weighing hopper that is positioned downstream of the direction in which the buckets are rotating. In other words, weighing hoppers on the downstream side are empty for a long time. When the number of empty weighing hoppers increases, the number of weighing hoppers that are included in combination weighing decreases. This produces problems such as a decline in combination weighing accuracy, or the combination weighting itself not being achieved.

In view of the above, there exists a need for a combination weighing apparatus which overcomes the above mentioned problems in the prior art. This invention addresses this need in the prior art as well as other needs, which will become apparent to those skilled in the art from this disclosure.

SUMMARY OF THE INVENTION

The object of the present invention is, in a combination weighing apparatus that supplies articles from article supply members that rotate with respect to a plurality of weighing hopper-type of weighing members, to prevent from occurring situations in which some of the weighing members cannot receive supply of articles easily, and increase combination weighting accuracy.

A combination weighing apparatus weighs a combination of articles based on weight data from a plurality of weighing members, the combination weighing apparatus comprising a plurality of article supply members, a rotation mechanism, and a controller. The plurality of article supply members each supply articles to any of a plurality of weighing members. The rotation mechanism rotates the plurality of article supply members so that the article supply members move along an arrangement of said plurality of weighing members in a weighing area. The weighing area is an area in which the plurality of weighing members are disposed. The controller controls the supply of articles from the article supply members in the weighing area to the plurality of weighing members. In addition, the controller selects from amongst the plurality of weighing members that request a supply of articles (hereinafter, article requesting weighing members), gives precedence to those weighing members that are downstream of the direction in which the article supply members move, and supplies articles thereto.

Here, when the article supply members that supply articles to the weighing members are rotated, and the article supply members enter into the weighing area, articles are supplied to the article requesting weighing members from these article supply members. Then, when articles are supplied to the article requesting weighing members from each article supply member in the weighing area, the controller supplies articles such that it gives precedence to the article requesting weighing members that are downstream.

In contrast to the situation in which the control of the supply of articles from the article supply members occurs when opposing weighing members request a supply of articles, because this type of control is achieved, problems such as the supply of articles to the article requesting weighing members not occurring despite the fact that a supply of articles was requested are prevented.

In other words, when article supply to weighing members unconditionally occurs in a supply system that circulates in one direction, the further downstream the weighing members are, the more difficult it becomes to supply articles to them. When this situation continues, there is a danger that the rate of productivity of the combination weighing apparatus might decrease because articles fail to be discharged properly. This sort of problem can be prevented in the present invention.

In addition, the rotation mechanism may circulate each article supply member in a horizontal plane, and may also circulate them such that they are perpendicular to each other. Further, the rotational path may be circular, oval, or elliptical.

Preferably, in the combination weighing apparatus, the rotation mechanism moves the plurality of article supply members such that the plurality of article supply members rotate between the weighing area and an article loading area. The article loading area is an area in which articles are loading into the article supply members.

Here, article supply members that have had articles loaded therein in the product loading area rotate to the weighing area. In the weighing area, article supply takes place from the article supply members to the article requesting weighing members such that the downstream article requesting weighing members take precedence.

Thus, because a construction is adopted in which articles are loaded into the article supply members in the article loading area, an automated weighing line can be easily designed. In addition, when articles are manually placed into the article supply members, the task of doing so is made easy because the location where this operation takes place is fixed in the article loading area.

Preferably, in the combination weighing apparatus, the controller, from amongst the plurality of weighing members that request article supply, controls the weighing members in order, starting with the weighing member that is furthest downstream in the direction in which the article supply members move.

Here, when the priority of article supply with respect to each weighing member is equal, product supply is difficult to perform in order. In other words, control occurs starting with the weighing member that is furthest downstream. Because of this, it is easy to place a large number of weighing members in a position in which they can be supplied with articles.

Preferably, in the combination weighing apparatus, the controller associates one article supply member capable of article supply with one weighing member that requests article supply. The associated article supply members includes the position opposite the weighing member that requests a supply of articles, the article supply member that is as close as possible to the upstream side in the direction of movement from that position, and the article supply members that are capable of supplying articles.

Here, the article supply members are associated in turn, beginning with the article supply member furthest downstream.

In addition, other than the article supply members that are actually confirmed to have articles placed therein, article supply members capable of supplying articles also includes article supply members in which it is presumed that articles have been placed therein.

Preferably, in the combination weighing apparatus, when there is a weighing member requesting a supply of articles in a position opposite an article supply member capable of supplying articles, the controller controls as below. If [N1] is less than or equal to [N2], articles are supplied from the article supply member that is in the position in front of the opposing weighing member to the opposing weighing member, and if [N1] is not less than or equal to [N2], articles are not supplied from the article supply member that is in the position in front of the opposing weighing member to the opposing weighing member.

[N1] represents weighing members that request a supply of articles, and is the number of such weighing members that are present from furthest downstream to the opposing weighing member. In addition, [N2] represents article supply members that are capable of supplying articles, and is the number of such article supply members that are present from the position of the weighing member that requests a supply of articles furthest downstream to the position of the article supply member in the position in front of the opposing weighing member.

Further, other than article supply members that are actually confirmed to have articles placed therein, article supply members capable of supplying articles includes article supply members that are presumed to have articles placed therein (article supply members that are not confirmed to be empty).

Preferably, in the combination weighing apparatus, each time the controller moves the plurality of article supply members only one fixed pitch of the plurality of weighing members, the controller repeats control of the supply of articles from the article supply members in the weighing area to the plurality of weighing members.

Here, because the aforementioned control is repeated each time the article supply members are moved one pitch, the most recent conditions can be quickly reflected in the control, such as the weighing members that have discharged articles in the combination weighing changing to weighing members that request a supply of articles, and weighing members changing to weighing members that request additional supplies.

Preferably, in the combination weighing apparatus, the controller, based upon combination weighing, sets the rotation cycle of the rotation mechanism to be faster than the article collection discharge process cycle of predetermined weighing members.

Here, in order to reduce the number of weighing members that cannot participate in combination weighing due to a lack of article supply, the rotation cycle of the article supply members is faster than the article collection discharge cycle. In this way, the incremental speed of the supply of articles by article supplying members and the weighing members that can participate in combination weighing can be prevented from dropping below the incremental speed of the discharge of articles and the weighing members that cannot participate in combination weighing.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 6 is a figure showing the chronological order of the states of the supply buckets and weighing hoppers in the weighing area;

FIG. 7 is a figure showing the chronological order of the states of the supply buckets and weighing hoppers in the weighing area; and FIG. 8 is a figure showing the chronological order of the states of the supply buckets and weighing hoppers in the weighing area.

DETAILED DESCRIPTION OF THE PREFERRED EMBODIMENTS

Figure 1:
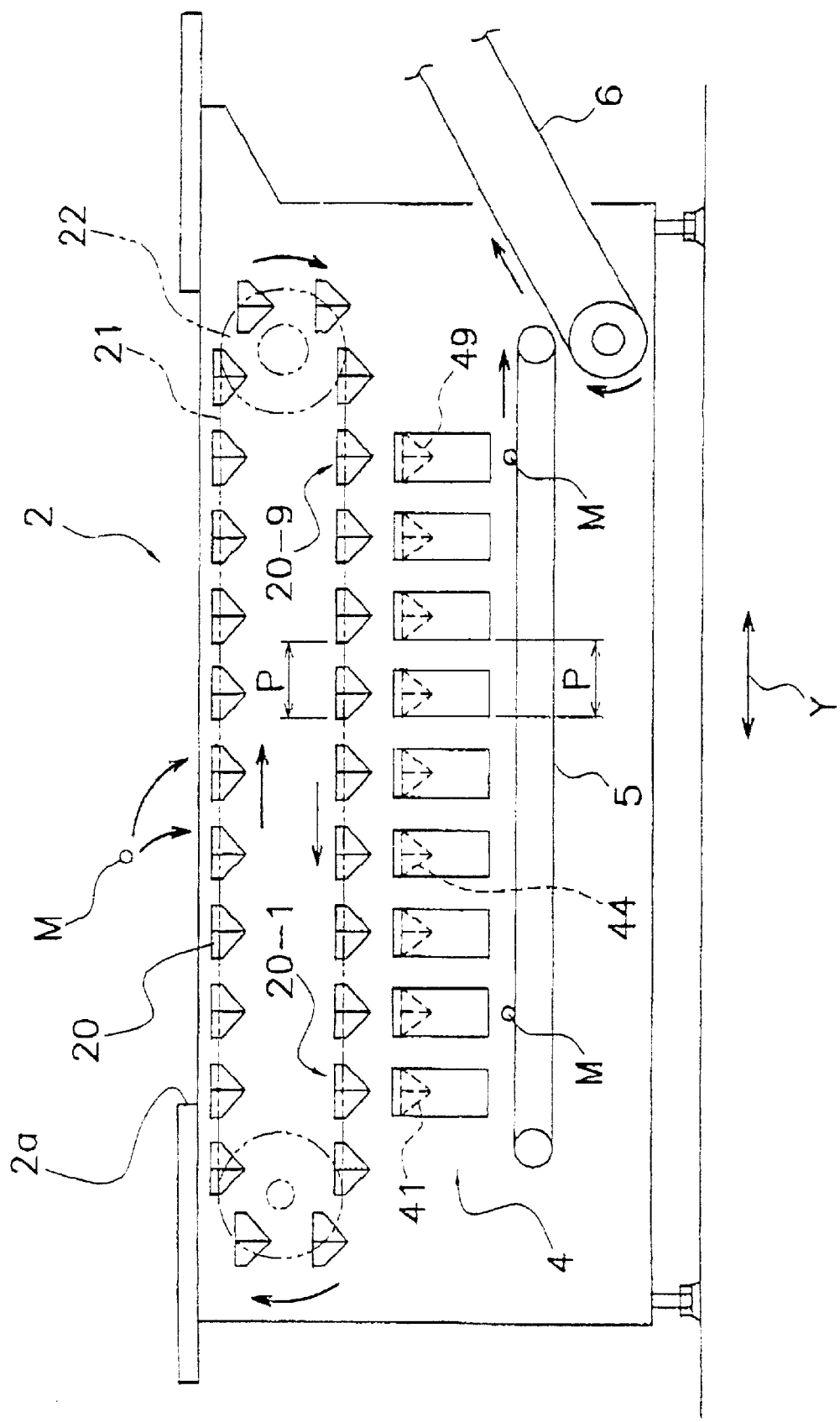
FIG. 1 is a schematic frontal view of a combination weighing apparatus according to a first embodiment of the present invention.

A combination weighing apparatus according to a first embodiment of the present invention is shown in FIG. 1. In this combination weighing apparatus, the weight of articles inside weighing hoppers are measured, the combination of each weight value is calculated, a plurality of weighing hoppers that make the total weight within a predetermined range are selected, and the articles from these weighing hoppers are collected. In this way, a collection of articles with a predetermined weight can be obtained.

<Structure Of The Combination Weighing Apparatus And Its General Operation>

Figure 2:
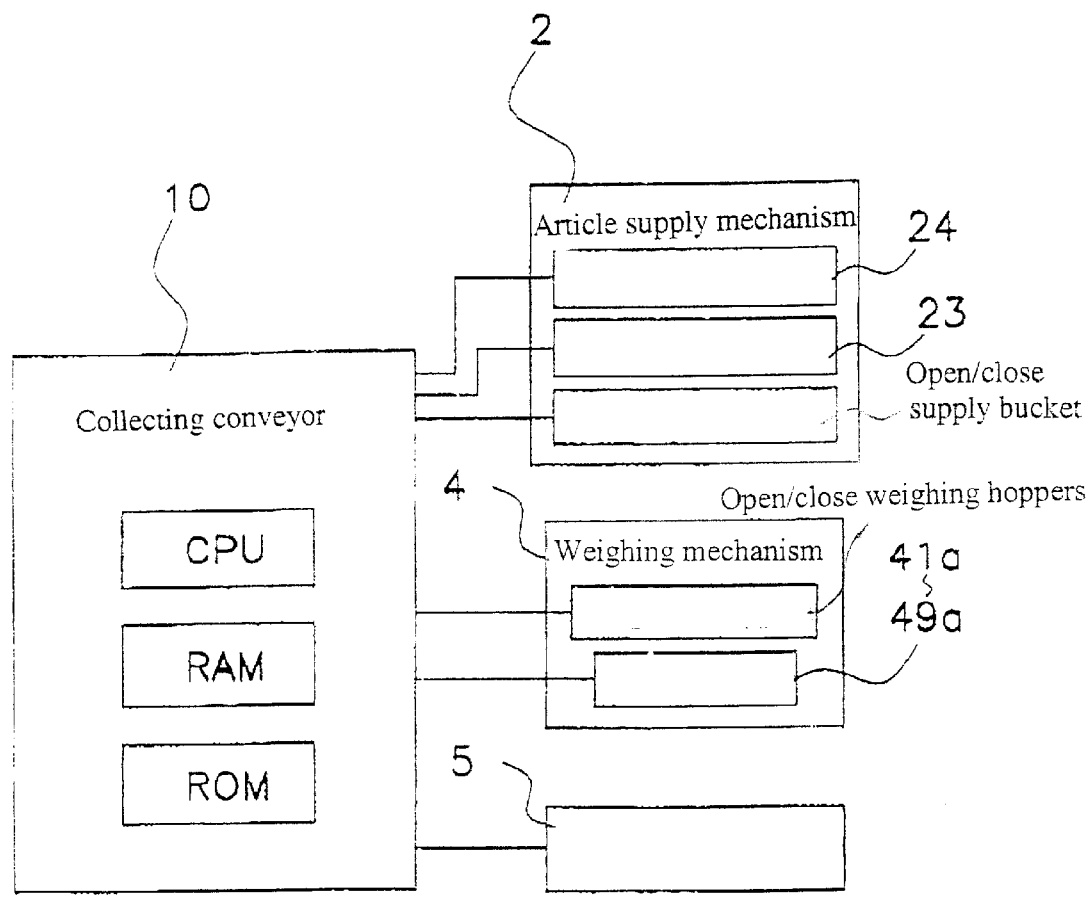
FIG. 2 is a control block for the combination weighing apparatus.

As shown in FIGS. 1 and 2, the combination weighing apparatus is comprised of an article supply mechanism 2, a weighing mechanism 4 that is provided below the article supply mechanism 2, a collecting conveyor 5, and a control computer 10.

[Article Supply Mechanism 2]

Article supply mechanism 2 has a plurality of supply buckets 20 (here, 26 buckets) that can discharge articles M down into weighing hoppers 41 to 49. Each supply bucket 20 is installed on an endless support member 21 comprised of a chain or the like. The preset pitch of the supply buckets 20 is the same as the preset pitch P of the weighing hoppers to be described below.

The endless support member 21 is driven by a motor 23 (see FIG. 2), via a sprocket 22. The motor 23, the sprocket 22, the endless support member 21 and the like, form a rotation mechanism, and this rotation mechanism is rotationally driven at a fixed speed along the row of weighing hoppers 41 to 49 perpendicular thereto and at the same attitude. In addition, a photointerrupter 24 (see FIG. 2), which is a sensor that detects the passage of the supply buckets 20, is disposed in the rotational path.

The supply buckets 20 are open on the upper portion thereof, and are containers that are divided in the center thereof. The divided portion of the supply buckets 20 open on command from the control computer 10, the articles received therein are discharged downward, and are supplied to any of the weighing hoppers 41 to 49 (described below).

In addition, the upper part of the rotational path of the supply buckets 20 is an article loading area, and the space directly above the weighing hoppers 41 to 49 (below the rotational path) is a weighing area. Then, articles are loaded into the supply buckets 20 in the article loading area, and in the weighing area, the articles are supplied to the weighing hoppers 41 to 49 from the supply buckets 20. In the weighing area, article supply positions 20-1 to 20-9 are above each weighing hopper 41 to 49 (see FIGS. 1 and 3).

[Weighing mechanism 4]

Figure 3:
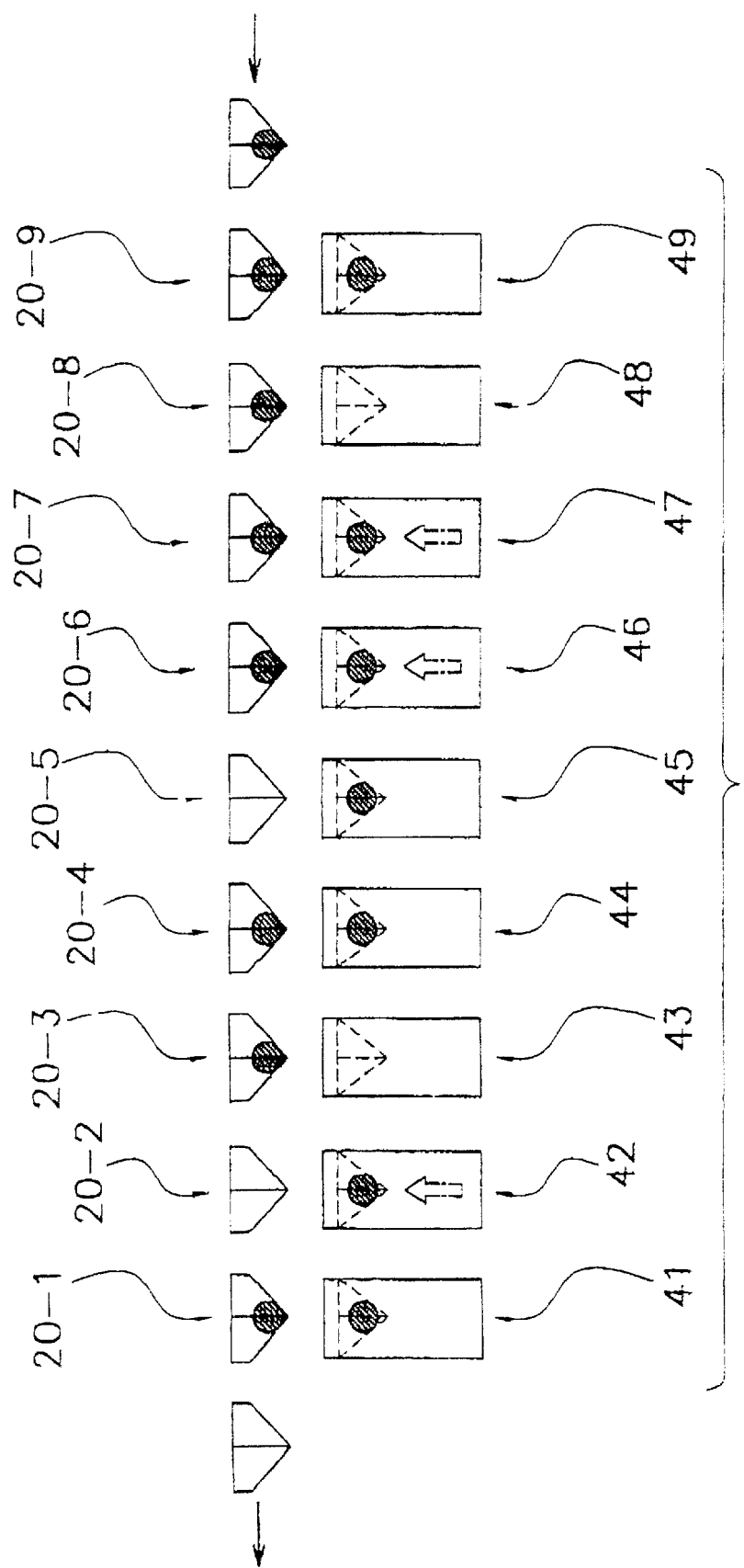
FIG. 3 is a figure showing the disposition of supply buckets and weighing hoppers in the vicinity of the weighing area.

As shown in FIGS. 1 and 3, the weighing mechanism 4 includes the plurality of weighing hoppers 41 to 49, which are arranged in a row longitudinally along a line Y. Each weighing hopper 41 to 49 is arranged at a fixed pitch P. In contrast to the rotation of the supply buckets 20, the position of these weighing hoppers 41 to 49 are fixed.

Load cells 41a to 49a (see FIG. 2) that detect the weight of articles M supplied from the supply buckets 20 are provided in each weighing hopper 41 to 49. In response to a request from control computer 10, these load cells 41a to 49a send weight detection data to the control computer 10.

In addition, like the supply buckets 20, the weighing hoppers 41 to 49 are also open on the upper portion thereof, and divided in the center thereof. On command from the control computer 10, the articles held therein are dropped downward.

[Control Computer 10]

As shown in FIG. 2, the control computer 10 is connected to the article supply mechanism 2, the weighing mechanism 4 and the collection conveyor 5. The control computer 10 has a CPU, RAM, and ROM, and controls each mechanism that it is connected to. In addition, the control computer 10 controls a delivery conveyor 6.

[General Operation Of The Combination Weighing Apparatus]

A loading port 2a for loading the articles M is provided in the upper surface of the combination weighing apparatus. When an operator loads articles M which are long, for example, bundles of scallions and the like, into supply bucket 20-i of the article supply mechanism 2 from the loading port 2a, the article supply mechanism 2 supplies the articles M to the weighing mechanism 4 as described below.

Each weighing hopper 41 to 49 of the weighing mechanism 4 holds the articles M supplied thereto, and measures the weight of the articles M. This weight data is sent to the control computer 10. Based upon the weight of the articles M in each weighing hopper 41 to 49, the control computer 10 performs a combination calculation so that the total weight is a value that is close to the desired value. Then, in order for the articles M in the plurality of weighing hoppers selected by the combination calculation to be dropped down onto the collection conveyor 5, the control computer 10 sends an open/close command to the selected weighing hoppers.

The articles M dropped from the weighing hoppers selected by the combination calculation land onto the collection conveyor 5 provided below the weighing mechanism 4. The collection conveyor 5 is an endless ring type of belt conveyor, and conveys the articles M to the delivery conveyor 6. Then, the collected articles M are discharged downstream from the delivery conveyor 6.

<Details Of The Control By The Control Computer 10>

As described above, the articles M are loaded into the supply buckets 20 of the article supply mechanism 2 and rotated, and are supplied to any of the weighing hoppers 41 to 49 of the weighing mechanism 4 from the supply buckets 20. Details on the control of the article supply from these supply buckets 20 to the weighing hoppers 41 to 49 will be provided below, based upon the control flow shown in FIG. 4.

[Overall Control]

The photointerrupter 24 detects the passage that accompanies the rotational movement of the supply buckets 20, and sends a signal to the control computer 10 every time the position of the supply buckets 20 moves by one pitch. The control computer 10 controls article supply, combination weighing, and collection discharge based upon this signal.

Figure 4:
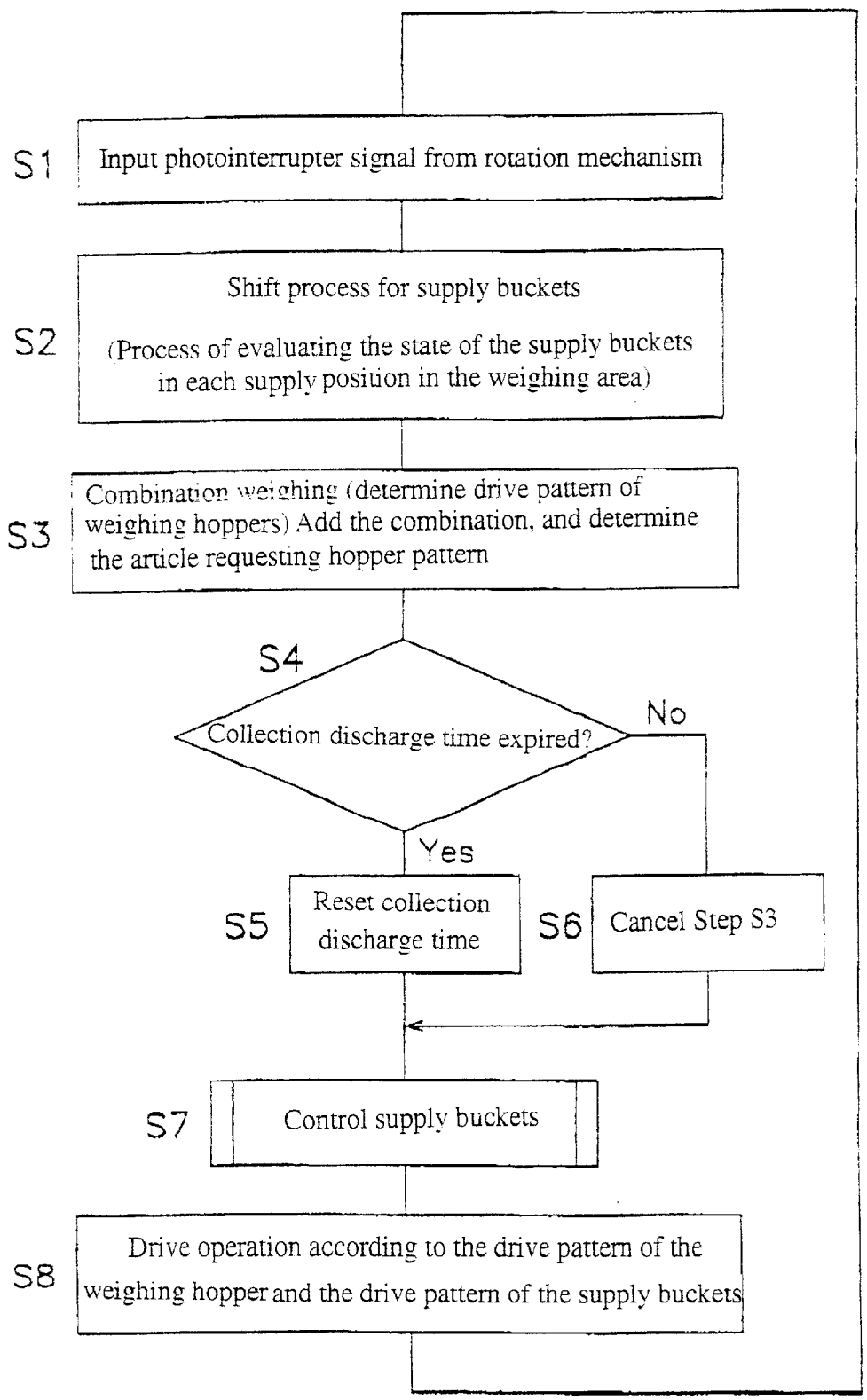
FIG. 4 is a figure showing the overall control flow of the combination weighing apparatus.

When a signal input is received from the photointerrupter 24 at Step 1 of FIG. 4, the control computer 10 executes a shift process of the supply buckets 20 (Step S2). Here, an evaluation is conducted as to whether or not the supply buckets 20 that have moved to each article supply position 20-1 to 20-9 in the weighing area hold articles. The supply buckets 20 that do hold articles are identified as buckets that are capable of supplying articles to the weighing hoppers (hereinafter referred to as supply capable buckets). The determination of whether each supply bucket 20 is a supply capable bucket assumes that articles have been loaded into all of the supply buckets 20 that have entered into the weighing area, and that there will be no more supply capable buckets when article supply operations in the weighing area have been completed.

Next, in Step S3, combination weighing takes place, and the drive pattern of the weighing hoppers is determined assuming that the selected hoppers are hoppers that must be driven. Then, because these selected weighing hoppers are empty due to the discharge of the articles therein, the pattern of the weighing hoppers that request a supply of articles (hereinafter referred to as article requesting hopper pattern) is also integrated therein. In addition, the weighing hoppers that request additional supply without an accompanying article discharge are also integrated into the article requesting hopper pattern. Further, each pattern is a 9 bit data object.

When all of the weighing hoppers 41 to 49 are empty, such as when the apparatus is started up, the article requesting hopper pattern is "111111111" because all of the weighing hoppers are requesting articles. Then, when the supply buckets 20 supply articles, the article requests of those weighing hoppers are deleted. For example, when articles are supplied to the weighing hopper 41, the article request hopper pattern becomes "011111111" (the first bit on the left corresponds to the weighing hopper 41, and the last bit on the right corresponds to the weighing hopper 49). On the other hand, even when there are articles in all of the weighing hoppers 41 to 49, when, for example, weighing hoppers 41 to 49 are selected by combination weighing, the article request hopper pattern will become "000011010". Whether or not a particular weighing hopper is an article requesting hopper is determined based upon its initial state, the article discharge operation, and the article supply operation. However, the detection values of the load cells 41a to 49a can also be used.

In Step S4, it is determined whether or not the "collection discharge time" that corresponds the collection discharge time interval of the articles in the combination weighing apparatus has expired. Here, when the collection discharge time has expired, the collection discharge time is reset at Step S5. On the other hand, when the collection discharge time has not expired, the process of Step S3 is cancelled. In other words, the process of integrating the selected weighing hoppers with the drive pattern and the article requesting hopper pattern is cancelled (Step S6). In this way, the drive pattern of the weighing hoppers 41 to 49 returns to not discharging any of the weighing hoppers 41 to 49, and even if Step S8 (described below) is executed, the weighing hoppers 41 to 49 will not be discharged.

In Step S7, control of the supply buckets 20 (described below) takes place. Here, the drive pattern of the supply buckets 20 is determined.

In Step S8, based upon the drive pattern of the weighing hoppers 41 to 49 determined at Step S3 (or cancelled at Step S6) and the drive pattern of the supply buckets 20 determined at Step S7, an open/close operation for the weighing buckets 41 to 49 and an open/close operation for the supply buckets 20 in positions 20-1 to 20-9 are executed.

The overall control shown in FIG. 4 and discussed above is repeated each time the supply buckets 20 are rotated one pitch.

[Article Supply Control]

Figure 5:
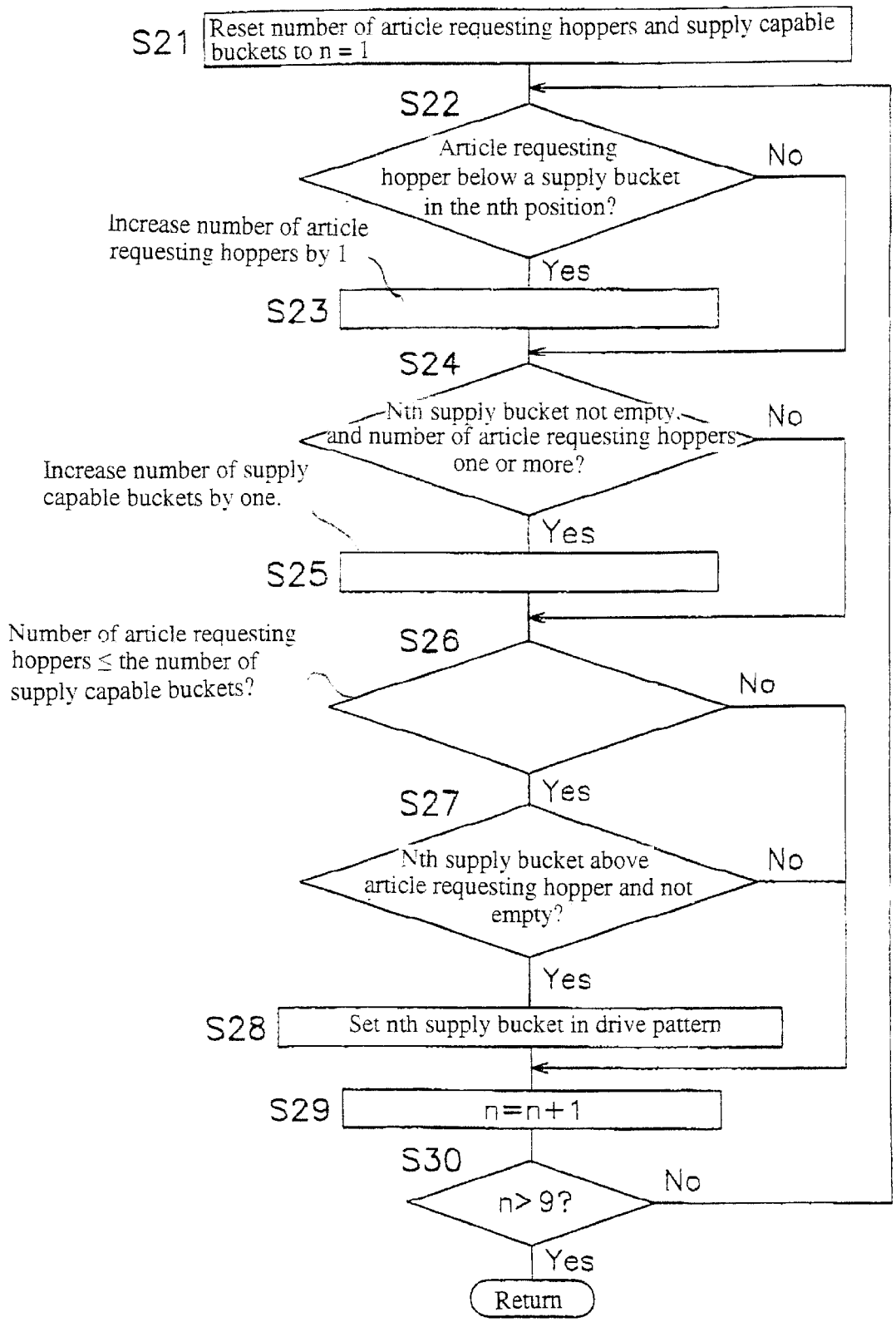
FIG. 5 is a figure showing the article supply control flow from the supply buckets to the weighing hoppers.

FIG. 5 shows the detailed flow of Step S7 of FIG. 4. The program shown in FIG. 5 is a subroutine of the overall control program of FIG. 4.

Here, first, in-Step S21, the number of article requesting hoppers and the number of supply capable buckets are reset to zero. In addition, a variable n that indicates the sequence of the article requesting hopper as counted from the downstream side of the weighing area is set to one. The number of article requesting hoppers is a quantity defined for to each position within the weighing area, and indicates the number of weighing hoppers requesting a supply of articles "N1" that exist between the weighing hopper requesting a supply of articles at furthest downstream and the nth weighing hopper. Further, the number of supply capable buckets is a quantity defined for each position within the weighing area. The number of supply capable buckets for the nth position of the weighing area indicates the number of supply buckets 20 capable of article supply "N2" (holding articles) that exist between the supply bucket 20 that is directly above the weighing hopper that is requesting a supply of articles at furthest downstream and the nth supply bucket.

In Step S22, it is determined whether or not the weighing hopper below the supply bucket 20 in the nth position of the weighing area is an article requesting hopper. This determination is made based upon the article requesting hopper pattern determined in Step S3 and the like. Here, if the weighing hopper below the supply bucket 20 in the nth position is an article requesting hopper, the article requesting hopper number is increased by one at Step S23.

Next, in Step S24, it is determined whether the supply bucket 20 in the nth position of the weighing area is not empty, and whether the article requesting hopper number is one or more. In other words, it is determined whether or not two conditions have been satisfied: whether the nth supply bucket 20 is an article capable bucket and whether the nth supply bucket 20 is on the upstream side (including the position directly above) of the position directly above the article requesting bucket furthest downstream. When these conditions are satisfied, one is added to the supply capable bucket number in Step S25.

In Step S26, it is determined whether or not the condition "the article requesting hopper number is less than the supply capable bucket number" is satisfied. When this condition is satisfied, the process moves to Step S27, and it is determined whether or not the condition "the nth supply bucket 20 is above an article requesting hopper and is not empty (a supply capable bucket)" is satisfied. Then, when these conditions are also satisfied, the process moves to Step S28, the nth supply bucket 20 is set in the supply bucket drive pattern, and in Step S28, article supply from the nth supply bucket 20 to the weighing hopper below takes place. When the conditions of Step S26 or Step S27 are not satisfied, the nth supply bucket 20 is excluded from the drive pattern.

In Step S29, (n+1) is substituted for the variable n. In Step S30, it is determined whether or not the variable n exceeds 9, and when the variable n is 9 or lower, the process returns again to Step S22. On the other hand, when it is determined that the variable n is larger than 9, the process of Step S7 is completed, and the process moves to Step S8.

Thus, the decision control for the supply bucket drive pattern shown in FIG. 5 determines whether or not supply operations (driving) take place in each supply bucket 20, from the supply bucket 20 in the first position to the supply bucket 20 in the ninth position in the weighing area, and determines the drive pattern for the supply buckets 20.

<An Example Of The State Of The Supply Buckets And The Weighing Hoppers In The Weighing Area In Chronological Order>

Figure 6:
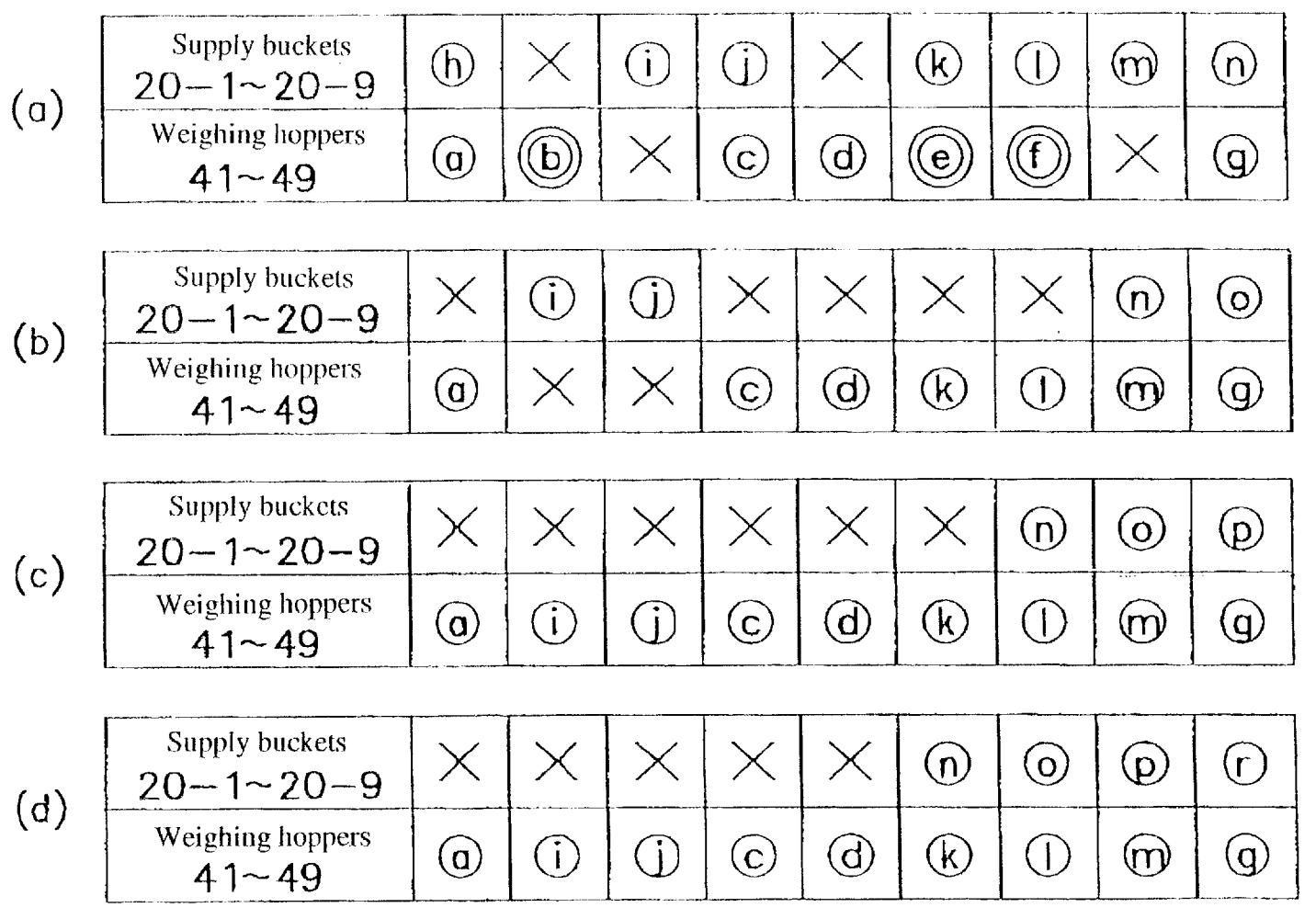

Due to the control described above, articles are supplied from the supply buckets 20 in weighing area positions 20-1 to 20-9 to the weighing hoppers 41 to 49 as shown in FIGS. 6 to 8.

FIG. 6A shows the state that corresponds to FIG. 3. Here, there are no articles in the supply buckets 20 in positions 20-2 and 20-5, but the supply buckets 20 in positions 20-1, 3, 4, and 5 to 9 are supply capable buckets. On the other hand, although there are articles in weighing hoppers 41, 42, 44, 45, 46, 47, and 49, weighing hoppers 42, 46, and 47 are article requesting hoppers because the articles in these three weighing hoppers will be discharged by combination weighing (shown in the figure by a double circle). Thus, in the state shown in FIG. 6A, the supply capable bucket pattern is "101101111" (1 indicates a supply capable bucket), and the article requesting hopper pattern is "011001110" (1 indicates an article requesting hopper).

Then, when the supply bucket drive pattern is determined as shown in FIG. 5, this drive pattern is "000001110". This indicates that supply operations will take place with the three supply buckets 20 in positions 20-6, 20-7 and 20-8. In this way, the articles k, l, and m in these supply buckets 20 will drop down to the weighing hoppers 46, 47, and 48. Then, when the supply buckets 20 are rotated one pitch from that position, they will be in the state shown in FIG. 6B.

With the rotation of one pitch from the state shown in FIG. 6B to the state shown in FIG. 6C, because the collection discharge time has not expired, the setting of the article requesting hopper pattern of the weighing hoppers selected during combination weighing is cancelled (Step S6 of FIG. 4), and the article requesting hopper pattern is formed from the weighing hoppers that are empty at that point in time. Thus, the article requesting hopper pattern is "011000000". In contrast to this, the supply capable bucket pattern is "011000011", and the supply bucket drive pattern thus becomes "011000000". In this way, the articles i and j in the supply buckets 20 drop down to the weighing hoppers 42 and 43. Then, when the supply buckets 20 are rotated one pitch from this position, they will be in the state shown in FIG. 6C.

Below, article supply to the weighing hoppers 41 to 49 from the supply buckets 20, and article discharge from the weighing hoppers 41 to 49, will be repeated in the same manner. Here, the rotation cycle is set so that it is faster than the collection discharge cycle, and thus collection discharge occurs one time for every four rotation cycles. In this situation, as shown in FIGS. 6 to 8, generally all of the weighing hoppers can participate in combination weighing when collection discharge occurs.

<Special Features Of The Combination Weighing Apparatus>

(1)

Here, from amongst the article requesting hoppers, the weighing hoppers that are downstream of the supply buckets 20 in the direction of rotation (the left side of FIGS. 1 and 3) are given precedence, and article supply takes place.

In contrast to the situation in which control occurs in which articles are supplied from the supply buckets 20 without other conditions when the weighing hopper directly below requests article supply, because this type of control occurs, problems such as article supply not readily occurring with respect to the downstream article requesting hoppers (for example, weighing hoppers 41 and 42) are reduced.

(2)

For example, as one will see and understand in FIG. 6, the article supply control shown in FIG. 5 and described above is a control that associates one supply capable bucket with one article requesting hopper downstream thereof. The associated supply capable buckets include supply buckets that are directly above article requesting hoppers, and are the supply capable buckets that are positioned as close as possible to the upstream side thereof.

In the state shown in FIG. 6A, first, the supply bucket 20 that holds article i (position 20-3) is assigned to the weighing hopper 42, which is the article requesting hopper that is furthest downstream. Next, the supply bucket 20 that holds article j (position 20-4) is assigned to the weighing hopper 43. The supply bucket 20 that holds article k (position 20-6) is assigned to the weighing hopper 46 directly below it, which is the next downstream article requesting hopper. Likewise, the supply buckets 20 that hold articles l and m (positions 20-7 and 20-8) are assigned to the weighing hoppers 47 and 48.

Thus, because the supply capable buckets are assigned in order from the downstream article requesting hoppers, priority can be given to the supply of articles to the downstream article requesting hoppers.

<Modifications>

(A)

In the embodiment described above, with regard to whether or not a particular supply bucket 20 is a supply capable bucket, it is assumed that articles are loaded into all of the supply buckets 20 that enter into the weighing area, and only the article supply operation that takes place in the weighing area determines that a supply bucket 20 is empty and not a supply capable bucket.

In situations in which there are cost allowances, it is preferable that a sensor for confirming whether or not articles are in each supply bucket 20 be disposed at the point in which each supply bucket 20 enters the weighing area from the article loading area. In this way, even in situations in which an operator loading articles into the supply buckets 20 misses an empty supply bucket 20, and did not have enough time to place an article therein, the control computer 10 can ascertain that this supply bucket 20 is empty. In this way, even in situations in which articles have not been loaded into some of supply buckets 20 in the article loading area, the article supply control can deal with the situation.

(B)

In the embodiment described above, the construction adopted is one in which the supply buckets 20 rotate perpendicular to each other as shown in FIG. 1. However, the rotation mechanism may also rotate each supply bucket 20 in a horizontal plane.

In addition, in the embodiment described above, the rotational path of the supply buckets is oval shaped. However, when a construction is adopted in which rotation occurs in a horizontal plane and the like, a circular or elliptical rotational path may be considered. In this situation, it becomes possible to apply the present invention to a combination weighing apparatus in which the weighing hoppers are disposed on the circumference thereof.

[Effects Of The Invention]

In the present invention, the article supply members that supply articles to the weighing members are rotated. When articles are supplied to the weighing members that request articles from each article supply member in the weighing area, article supply is controlled so that priority is given to the downstream weighing members that request articles. Therefore, in contrast to the situation in which control occurs such that articles are supplied without taking into account any other condition from the article supply members when the corresponding weighing members request article supply, problems such as article supply not readily occurring to the weighing members that request articles despite the fact that article supply is requested can be prevented.

The terms of degree such as "substantially", "about" and "approximately" as used herein mean a reasonable amount of deviation of the modified term such that the end result is not significantly changed. These terms should be construed as including a deviation of at least +5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A combination weighing apparatus that weighs a combination of articles, said combination weighing apparatus comprising:
a plurality of weighing members each producing weight data and disposed in a weighing area, said weighing members being capable of requesting a supply of articles;
a plurality of article supply members that supply articles to any of said plurality of weighing members;
a rotation mechanism that rotates said plurality of article supply members so that said article supply members move in correspondence with an arrangement of said plurality of weighing members while said plurality of article supply members are in said weighing area; and
a controller that controls the supply of articles from said article supply members that are in said weighing area to said weighing members that request a supply of articles, said controller giving priority to, from amongst said weighing members that request a supply of articles, weighing members that are in downstream in a direction of movement of said article supply members, and supplying articles thereto.

2. The combination weighing apparatus according to claim 1, wherein
said rotation mechanism moves said plurality of article supply members such that said plurality of article supply members rotate between said weighing area and an article loading area in which articles are loaded into said article supply members.

3. The combination weighing apparatus according to claim 1, wherein
said controller performs control on said weighing members that request a supply of articles, in an order beginning with a weighing member furthest downstream in the direction of movement of said article supply members.

4. The combination weighing apparatus according to claim 3, wherein
said controller associates each of said weighing members that request a supply of articles, on a one to one basis, with an article supply member that is capable of supplying articles and is in a position closest to and on an upstream side of, including a position directly above, the weighing member, the upstream side being relative to the direction of movement of said article supply members.

5. The combination weighing apparatus according to claim 3, wherein
said controller compares a number [N1] and a number [N2] when there is an opposing weighing member, said opposing weighing member being a weighing member that requests a supply of articles and is in a position opposite an article supply member that is capable of supplying articles, said number [N1] being the number of weighing members that request a supply of articles and are present between and including said opposing weighing member and the weighing member at furthest downstream among said weighing members requesting a supply of articles, said number [N2] being the number of article supply members that are capable of supplying articles and are present between and including said article supply member opposite said opposing weighing portion and said article supply member opposite said weighing member at furthest downstream among said weighing members requesting a supply of articles;
said controller makes said article supplying member in the position opposite said opposing weighing portion supply articles to said opposing weighing portion when [N1]<[N2] is satisfied; and
said controller does not allow said article supplying member in the position opposite said opposing weighing portion to supply articles to said opposing weighing portion when [N1]<[N2] is not satisfied.

6. The combination weighing apparatus according to claim 1, wherein
said controller repeats the control of the supply of articles to said plurality of weighing members from said article supply members in said weighing area every time said rotation mechanism moves said plurality of article supply members by one fixed pitch of said plurality of weighing members.

7. The combination weighing apparatus according to claim 1, wherein
said controller sets the rotation cycle of said rotation mechanism to be faster than a collection discharge process cycle of articles from predetermined weighing members, the collection discharge process cycle being determined based upon the combination weighing.

8. A method of combination weighing for use in a combination weighing apparatus, said method of combination weighing comprising the steps of:
providing a plurality of weighing members each producing weight data and disposed in a weighing area;
providing a plurality of article supply members that supply articles to the weighing members;
selecting some of the weighing members such that a total weight of the articles therein is within a predetermined range of a desired weight based on the weight data from the weighing members;
collecting and discharging the articles from the selected weighing members; and
supplying articles to the weighing members by
rotating the plurality of weighing members such that the article supply members move in correspondence with an arrangement of the weighing members while the article supply members are in the weighing area,
receiving a request for supply of articles from the weighing members,
supplying articles from article supply members that are in the weighing area to weighing members that request a supply of articles, giving priority to, from amongst the weighing members that request a supply of articles, weighing members that are in downstream in a direction of movement of the article supply members.

9. The method of combination weighing according to claim 8, wherein
the plurality of article supply members are moved such that the plurality of article supply members rotate between the weighing area and an article loading area in which articles are loaded into the article supply members.

10. The method of combination weighing according to claim 8, wherein
articles are supplied to the weighing members that request a supply of articles, in an order beginning with a weighing member furthest downstream in the direction of movement of the article supply members.

11. The method of combination weighing according to claim 10, wherein said step of supplying the articles to the weighing members includes associating each of the weighing members that request a supply of articles, on a one to one basis, with an article supply member that is capable of supplying articles and is in a position closest to and on an upstream side of, including a position directly above, the weighing member, the upstream side being relative to the direction of movement of the article supply members.

12. The method of combination weighing according to claim 10, wherein said step of supplying the articles to the weighing members includes comparing a number [N1] and a number [N2] when there is an opposing weighing member, said opposing weighing member being a weighing member that requests a supply of articles and is in a position opposite said article supply member that is capable of supplying articles, said number [N1] being the number of weighing members that request a supply of articles and are present between and including said opposing weighing member and the weighing member at furthest downstream among said weighing members requesting a supply of articles, said number [N2] being the number of article supply members that are capable of supplying articles and are present between and including the article supply member opposite the opposing weighing portion and the article supply member opposite the weighing member at furthest downstream among the weighing members requesting a supply of articles; and supplying articles to the opposing weighing member from the article supplying member in the position opposite the opposing weighing member when [N1] ≦[N2] is satisfied.

13. The method of combination weighing according to claim 8, wherein said supply of articles from the article supply members in the weighing area to the weighing members requesting a supply of articles is repeated every time the plurality of article supply members are rotated by one fixed pitch of the plurality of weighing members.

14. The method of combination weighing according to claim 8, wherein said collection and discharge of the articles from the selected weighing members is performed cyclically, a cycle of collection and discharge being determined based upon the combination weighing, and said rotation of the weighing members is performed cyclically, a cycle of rotation of the weighing members being shorter than the cycle of collection and discharge.

* * * * *